United States Patent
Darr et al.

(10) Patent No.: US 7,684,924 B2
(45) Date of Patent: *Mar. 23, 2010

(54) THERMAL DETECTION AND PROTECTION OF VEHICLE HARDWARE

(75) Inventors: Rebecca J Darr, Milford, MI (US); Steve L Melby, Howell, MI (US)

(73) Assignee: GM Global Technology Operations, Inc.

( * ) Notice: Subject to any disclaimer, the term of this patent is extended or adjusted under 35 U.S.C. 154(b) by 18 days.

This patent is subject to a terminal disclaimer.

(21) Appl. No.: 12/109,716

(22) Filed: Apr. 25, 2008

(65) Prior Publication Data

US 2009/0012694 A1    Jan. 8, 2009

Related U.S. Application Data

(60) Provisional application No. 60/926,815, filed on Jul. 2, 2007.

(51) Int. Cl.
*F02D 41/30* (2006.01)

(52) U.S. Cl. .......................... 701/112; 123/676; 60/285

(58) Field of Classification Search ................ 123/435, 123/672, 689, 481, 676; 60/274, 284–286, 60/295, 297; 701/102, 112
See application file for complete search history.

(56) References Cited

U.S. PATENT DOCUMENTS

| | | | | |
|---|---|---|---|---|
| 6,497,095 | B2 * | 12/2002 | Carberry et al. | 60/295 |
| 6,598,387 | B2 * | 7/2003 | Carberry et al. | 60/297 |
| 6,622,480 | B2 * | 9/2003 | Tashiro et al. | 60/295 |
| 6,763,659 | B2 * | 7/2004 | Watanabe et al. | 60/297 |
| 6,951,100 | B2 * | 10/2005 | Kuboshima et al. | 60/311 |
| 6,978,602 | B2 * | 12/2005 | Ohtake et al. | 60/295 |
| 7,021,051 | B2 * | 4/2006 | Igarashi et al. | 60/295 |
| 7,137,246 | B2 * | 11/2006 | van Nieuwstadt et al. | 60/295 |
| 7,340,886 | B2 * | 3/2008 | Kawashima et al. | 60/295 |
| 2007/0271902 | A1 * | 11/2007 | Noirot et al. | 60/273 |
| 2009/0151337 | A1 * | 6/2009 | Tornambe | 60/295 |

* cited by examiner

*Primary Examiner*—Hai J Huynh
(74) *Attorney, Agent, or Firm*—Harness, Dickey & Pierce, P.L.C.

(57) ABSTRACT

A control module comprises a thermal detection module and a protection module. The thermal detection module receives temperature data of a particulate matter filter and determines a temperature based on the temperature data. The protection module selectively reduces output of an engine when the temperature is greater than a temperature threshold. A method comprises receiving temperature data of a particulate matter filter and selectively reducing output of an engine when a temperature based on the temperature data is greater than a temperature threshold.

20 Claims, 3 Drawing Sheets

THERMAL DETECTION AND PROTECTION OF VEHICLE HARDWARE

CROSS-REFERENCE TO RELATED APPLICATIONS

This application claims the benefit of U.S. Provisional Application No. 60/926,815, filed on Jul. 2, 2007. The disclosure of the above application is incorporated herein by reference in its entirety.

FIELD

The present disclosure relates to particulate matter filters, and more particularly, to methods and systems for detection of and protection against thermal conditions.

BACKGROUND

The background description provided herein is for the purpose of generally presenting the context of the disclosure. Work of the presently named inventors, to the extent it is described in this background section, as well as aspects of the description that may not otherwise qualify as prior art at the time of filing, are neither expressly nor impliedly admitted as prior art against the present disclosure.

Vehicles may include exhaust after-treatment devices such as particulate matter (PM) filters and catalysts to reduce emissions. In a diesel engine, the PM filter may be referred to as a diesel particulate filter (DPF). Engine control systems may fail to accurately diagnose when there is excessive thermal energy in the exhaust. In some circumstances, excessive thermal energy may damage components of the vehicle.

SUMMARY

A control module comprises a thermal detection module and a protection module. The thermal detection module receives temperature data of a particulate matter filter and determines a temperature based on the temperature data. The protection module selectively reduces output of an engine when the temperature is greater than a temperature threshold.

In other features, the reducing output includes limiting torque of the engine to a predetermined threshold. The reducing output includes limiting power of the engine to a predetermined threshold. The reducing output includes shutting down the engine. The temperature data includes temperature data from an inlet and an outlet of the particulate matter filter. The control module further comprises a protection enable module that generates an enable signal based on at least one of fuel delivery rate, engine speed, ambient temperature, and vehicle speed. The protection module reduces the output when the enable signal is received and the temperature is greater than a temperature threshold.

In further features, the protection enable module generates the enable signal when at least one of the fuel delivery rate, engine speed, ambient temperature, and vehicle speed is outside of a range established by respective lower limits and upper limits. The protection module selectively reduces the output of the engine when the temperature is greater than the temperature threshold and a confirmation condition is present. The confirmation condition is based on at least one of an engine misfire signal, a leaky fuel injector signal, and a pressure signal.

In still other features, the pressure signal is based on a pressure differential between an outlet and an inlet of the particulate matter filter. The thermal detection module evaluates the temperature data and disables the protection module from reducing the output of the engine when the temperature data is determined not to be reliable. The thermal detection module evaluates the temperature data by comparing a rate of change of a component of the temperature data to a predetermined threshold.

A method comprises receiving temperature data of a particulate matter filter and selectively reducing output of an engine when a temperature based on the temperature data is greater than a temperature threshold. In other features, the reducing output includes limiting torque of the engine to a predetermined threshold. The reducing output includes limiting power of the engine to a predetermined threshold. The reducing output includes shutting down the engine.

In other features, the temperature data includes temperature data from an inlet and an outlet of the particulate matter filter. The method further comprises generating an enable signal based on at least one of fuel delivery rate, engine speed, ambient temperature, and vehicle speed. The reducing is performed when the enable signal is received and the temperature is greater than a temperature threshold.

In further features, the method further comprises generating the enable signal when at least one of the fuel delivery rate, engine speed, ambient temperature, and vehicle speed is outside of a range established by respective lower limits and upper limits. The reducing is performed when the temperature is greater than the temperature threshold and a confirmation condition is present. The confirmation condition is based on at least one of an engine misfire signal, a leaky fuel injector signal, and a pressure signal.

In still other features, the pressure signal is based on a pressure differential between an outlet and an inlet of the particulate matter filter. The method further comprises evaluating the temperature data for reliability by comparing a rate of change of a component of the temperature data to a predetermined threshold; and disabling the reducing when the temperature data is determined not to be reliable.

Further areas of applicability of the present disclosure will become apparent from the detailed description provided hereinafter. It should be understood that the detailed description and specific examples, while indicating the preferred embodiment of the disclosure, are intended for purposes of illustration only and are not intended to limit the scope of the disclosure.

BRIEF DESCRIPTION OF THE DRAWINGS

The present disclosure will become more fully understood from the detailed description and the accompanying drawings, wherein.

DETAILED DESCRIPTION

Figure 1:
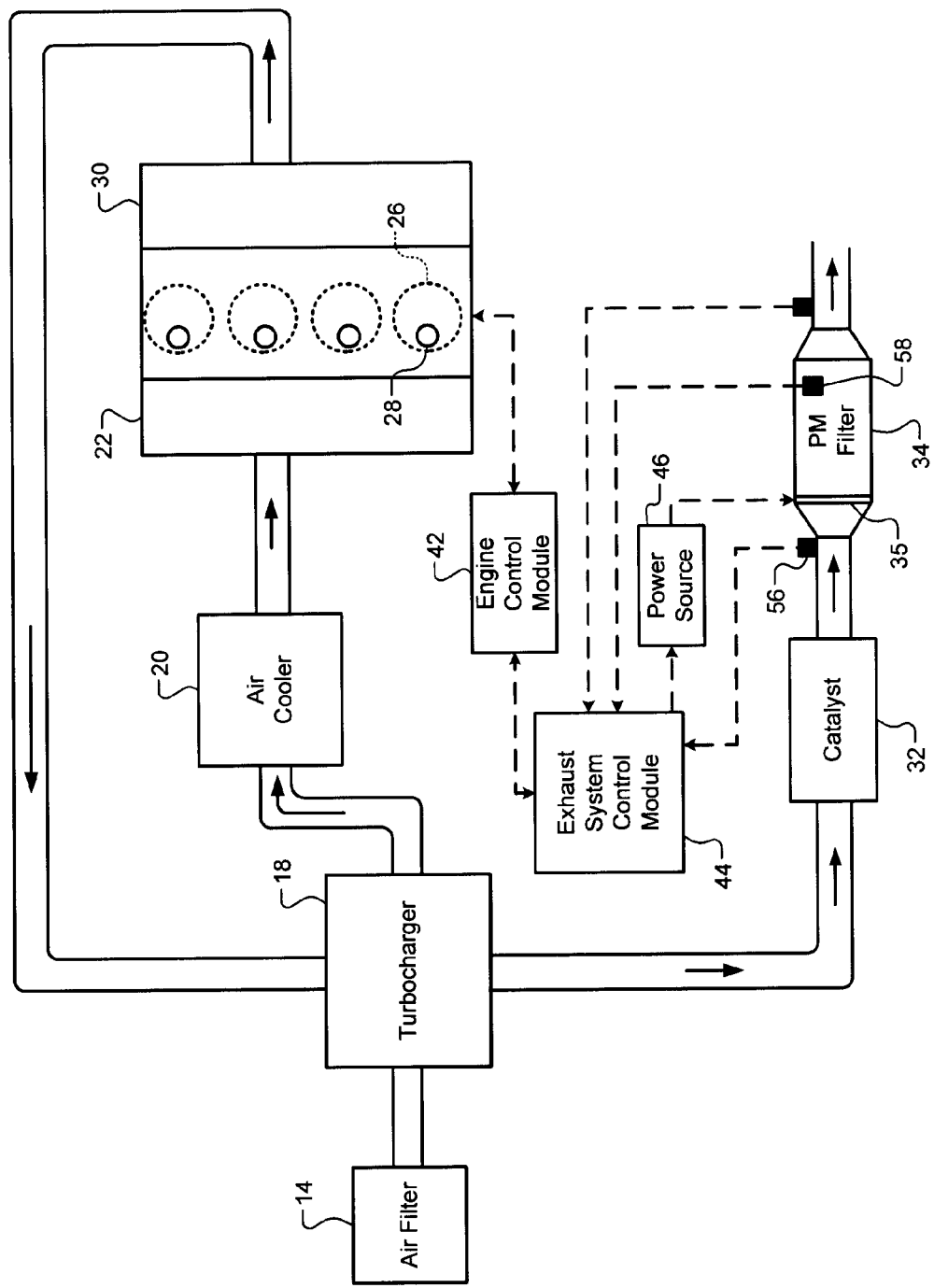
FIG. 1 is a functional block diagram of an exemplary vehicle according to the principles of the present disclosure.

The following description is merely exemplary in nature and is in no way intended to limit the disclosure, its application, or uses. For purposes of clarity, the same reference numbers will be used in the drawings to identify similar elements. As used herein, the phrase at least one of A, B, and C should be construed to mean a logical (A or B or C), using a non-exclusive logical or. It should be understood that steps within a method may be executed in different order without altering the principles of the present disclosure.

As used herein, the term module refers to an Application Specific Integrated Circuit (ASIC), an electronic circuit, a processor (shared, dedicated, or group) and memory that execute one or more software or firmware programs, a combinational logic circuit, and/or other suitable components that provide the described functionality.

Particulate matter (PM) filters remove particulate matter from engine exhaust. Over time, the particulate matter builds up. This build-up can be removed by burning it in a process called regeneration. Regeneration may be initiated in a variety of ways, such as by heating the PM filter with an electrical heater or combusting a richer air/fuel mixture in the engine.

The heat created in regeneration is intense, and if too much heat is generated, the PM filter may be damaged. In extreme cases, the PM filter may melt and/or break apart, which may cause damage to other components of the exhaust system and the vehicle. In order to prevent over-heating, a control module according to the principles of the present disclosure monitors the PM filter. For example, monitored parameters may include inlet and exhaust temperatures of the PM filter, pressure differentials between inlet and exhaust, airflow rate through the PM filter, etc.

During regeneration, if the PM filter appears to be getting too hot, the regeneration mode may be stopped. For example, this may include leaning out the air/fuel mixture and/or removing power from the heater. If the PM filter remains too hot, or increases in temperature, the control module may request remedial action. Remedial action may include warnings to the driver and automated steps such as torque limiting, power limiting, or fuel limiting the engine. In extreme cases, the control module may power the engine down completely.

When the PM filter is not in regeneration mode, the PM filter should not be operating at the high temperatures expected in regeneration, and the temperature at which remedial action is initiated may be decreased. High PM filter temperatures may be explained by various conditions, including leaky fuel injectors and engine misfires. These conditions may be used to confirm the accuracy of high measured PM temperatures before remedial action is initiated.

In addition to being confirmed by such conditions as leaky fuel injectors and/or engine misfires, temperature data may be checked for rationality. This helps to prevent remedial action from being erroneously initiated based on faulty temperature data. Temperature problems in the PM filter may be determined based on, for example, inlet temperature, outlet temperature, a combination of the two, and historical data of the temperatures. For example, high rates of temperature change may be indicative of a problem. In addition, a large pressure or temperature differential between the inlet and the outlet may indicate a problem.

Referring now to FIG. 1, an exemplary diesel engine system 10 is schematically illustrated in accordance with the present disclosure. The diesel engine system 10 is merely exemplary in nature. The PM filter system described herein can be implemented in various engine systems implementing a PM filter. Such engine systems may include, but are not limited to, gasoline direct injection engine systems and homogeneous charge compression ignition engine systems. For ease of the discussion, the disclosure will be discussed in the context of a diesel engine system.

The diesel engine system 10 includes an engine 12 that combusts an air/fuel mixture to produce drive torque. Air enters the system by passing through an air filter 14, and may be drawn into a turbocharger 18. While a turbo-charged diesel engine 12 is shown, supercharged or naturally aspirated engines may also be used. The turbocharger 18 compresses the fresh air entering the diesel engine system 10. Generally, the greater the compression of the air, the greater the output of the engine 12. The compressed air charge then passes through an air cooler 20 before entering into an intake manifold 22.

Air within the intake manifold 22 is distributed into cylinders 26. Although four cylinders 26 are illustrated, the systems and methods of the present disclosure can be implemented in engines having a plurality of cylinders including, but not limited to, 2, 3, 4, 5, 6, 8, 10, and 12 cylinders. It should also be appreciated that the systems and methods of the present disclosure can be implemented in a "V"-type cylinder configuration. Fuel may be injected into the cylinders 26 by fuel injectors 28. Heat from the compressed air charge being further compressed by a piston (not shown) ignites the air/fuel mixture. Combustion of the air/fuel mixture creates power to push the piston back down, which is translated to rotational energy of a crankshaft. Exhaust from combustion exits the cylinders 26 into the exhaust system.

The exhaust system may include an exhaust manifold 30, a diesel oxidation catalyst (DOC) 32, and a PM filter 34, which may include a heater 35. Optionally, an EGR valve (not shown) may re-circulate a portion of the exhaust back into the intake manifold 22. The remainder of the exhaust may be directed into the turbocharger 18 to drive a turbine. The turbine provides the power to compress the fresh air received from the air filter 14. Exhaust flows from the turbocharger 18 through the DOC 32 and into the PM filter 34. The DOC 32 may oxidize the exhaust based on the post-combustion air/fuel ratio. The amount of oxidation may affect the temperature of the exhaust. The PM filter 34 may receive exhaust from the DOC 32 and filter particulate matter out of the exhaust.

The heater 35 may provide heat to the PM filter 34 to combust particulate matter that builds up over time in a process known as regeneration. While a heater is shown, other methods may be used to promote combustion of particulate matter within the PM filter 34. For example only, changes to an air-to-fuel ratio and/or spark timing may be made by an engine control module 42, which controls the engine 12.

An exhaust system control module 44 may control the PM filter 34 based on various sensed information. More specifically, the exhaust system control module 44 may estimate loading of the PM filter 34. When the estimated loading reaches a predetermined level and the exhaust flow rate is within a predetermined range, current may be provided to the heater 35 via a power source 46 to initiate the regeneration process. The duration of the regeneration process may be varied based upon the estimated amount of particulate matter within the PM filter 34.

Current may be applied to the heater 35 during the regeneration process. More specifically, the electric energy may heat the heater 35 at selected portions of the inlet of the PM filter 34 for predetermined periods. Exhaust passing through the front face of the PM filter 34 may be heated. The regeneration process may be achieved using the heat generated by combustion of particulate matter present near the heated face of the PM filter 34 or by the heated exhaust passing through the PM filter 34.

The PM filter 34 may include a PM filter inlet temperature sensor 56, a PM filter outlet temperature sensor 57, and/or a PM filter exterior temperature sensor 58. The PM filter temperature sensors 56, 57, 58 may generate temperature signals that are received by the exhaust system control module 44.

Figure 2:
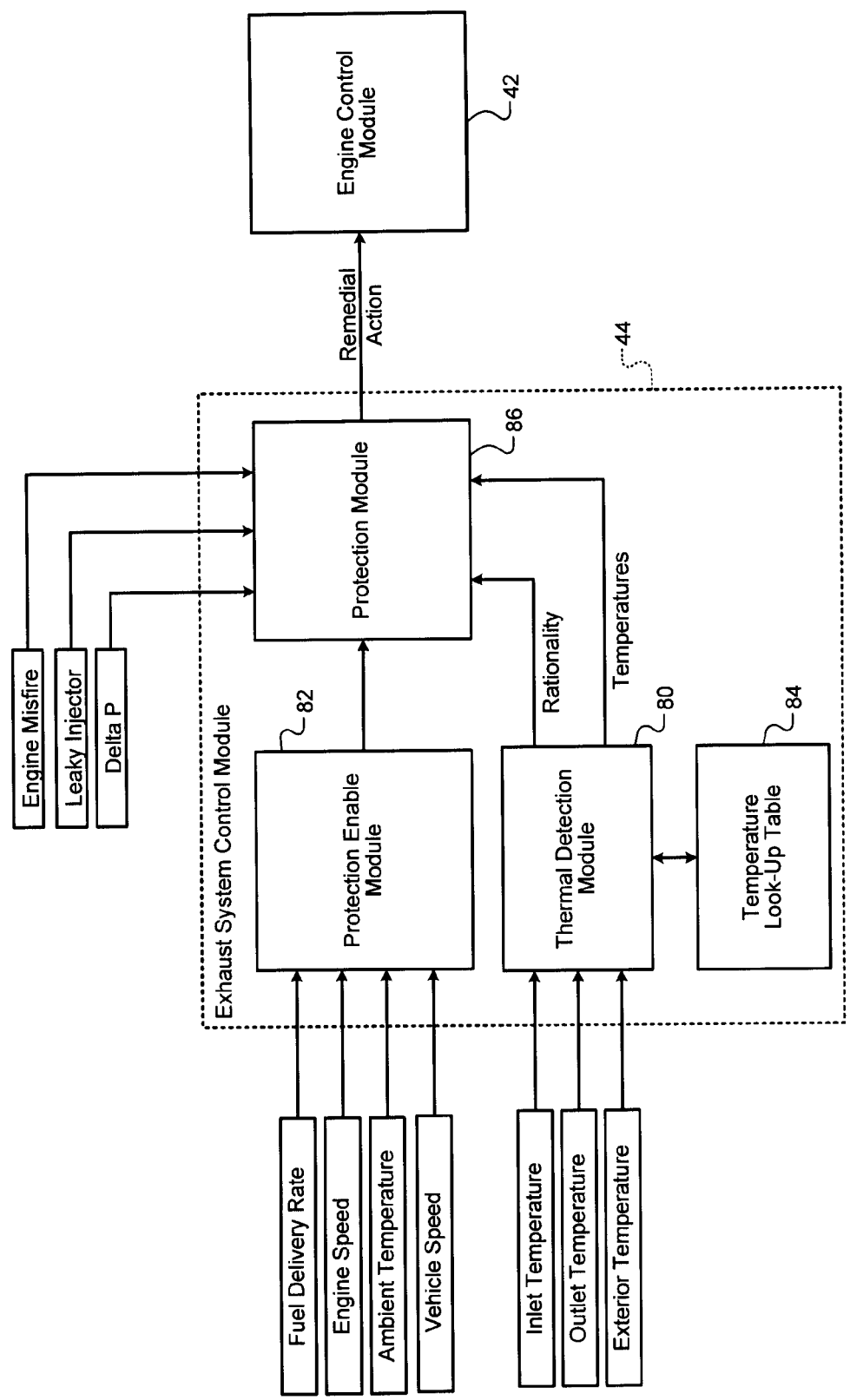
FIG. 2 is a functional block diagram of an exemplary control module according to the principles of the present disclosure.

Referring now to FIG. 2, an exemplary implementation of the exhaust system control module 44 includes a thermal detection module 80, a protection enable module 82, a temperature look-up table 84, and a protection module 86. The thermal detection module 80 may receive PM filter temperature values from the PM filter temperature sensors 56, 57, 58.

The thermal detection module 80 may be in communication with the temperature look-up table 84 to determine whether the measured temperatures indicate an over-temperature condition and whether the measured values are rational. The temperature look-up table 84 may store temperatures at which an over-temperature condition may be detected as well as rationality conditions for the measured data.

For example, rationality conditions may include difference between the outlet and inlet temperatures or the rate of change in the measured temperatures over time. For example, temperature data may be determined to be rational if the difference is less than a predetermined threshold and the rate of change of each of the measured temperatures is below another predetermined threshold.

Based on temperature data from the thermal detection module 80, the protection module 86 determines whether to initiate remedial action with a request to the engine control module 42. The protection module 86 may evaluate one or more temperatures to see if they are above a threshold. For example, this threshold may vary based upon whether the exhaust system is currently in regeneration mode.

The protection module 86 may also evaluate temperature rationality data from the thermal detection module 80. This helps to prevent unnecessary remedial action due to high detected temperatures that are a result of sensor error rather than actual high temperatures. The protection module 86 may receive an enable signal from the protection enable module 82.

The protection enable module 82 may enable remedial action only when allowing remedial action would be safe for the vehicle and the driver. For example, if the ambient air temperature is above a threshold, such as 110° F., or below a second threshold, such as −20° F., the protection enable module 82 may disable remedial action. Alternatively, in these situations, the range of remedial action may be limited. For example, power limiting may be used, but powering down the engine completely may be disabled. Because of the extreme ambient air temperature, it is more important to keep the engine running for user comfort than to protect against a sensed over-temperature condition.

Other protection enable conditions may include vehicle speed, engine speed, and fuel delivery rate. The protection enable module 82 evaluates these and/or other inputs, such as by applying maximum and minimum limits. For example, if a vehicle speed is above a threshold, the protection enable module 82 may disable remedial action. Remedial action may remain disabled until the driver brings the vehicle to a stop.

The protection module 86 may also receive confirmation signals. For example, these may include engine misfire, leaky fuel injector, and pressure delta signals. The protection module 86 may use these signals to confirm that an over-temperature condition is occurring. This may prevent unnecessary remedial action based on misleading temperature data.

For example, a high pressure difference between the inlet of the PM filter 34 and the outlet of the PM filter 34 may occur when an over-temperature condition is occurring. The pressure differential may be measured by a single differential pressure sensor. A pressure differential threshold above which over-temperature conditions may be present may be determined based on a volume flow rate and a temperature. For example, the volume flow rate may be calculated based on mass air flow, while the temperature may be an average of the inlet and outlet temperatures of the PM filter 34.

If engine misfire is detected or a fuel injector is leaking, extra unburned fuel may arrive at the PM filter 34, thereby increasing the temperature of the PM filter 34. In one scenario, the combustion initiated by regeneration may continue even once all the particulate matter is combusted because unburned fuel continues to arrive from the engine. This prolonged combustion may raise temperatures at the PM filter 34.

In some modes, the protection module 86 may therefore initiate remedial action only when one or more of the confirmation signals is present. Alternatively, when one or more of the confirmation signals is present, the protection module 86 may lower the temperature threshold that defines an over-temperature condition. Which confirmation signals are used by the protection module 86 may be determined while the vehicle is running based on operating conditions and/or may be established by calibration.

Figure 3:
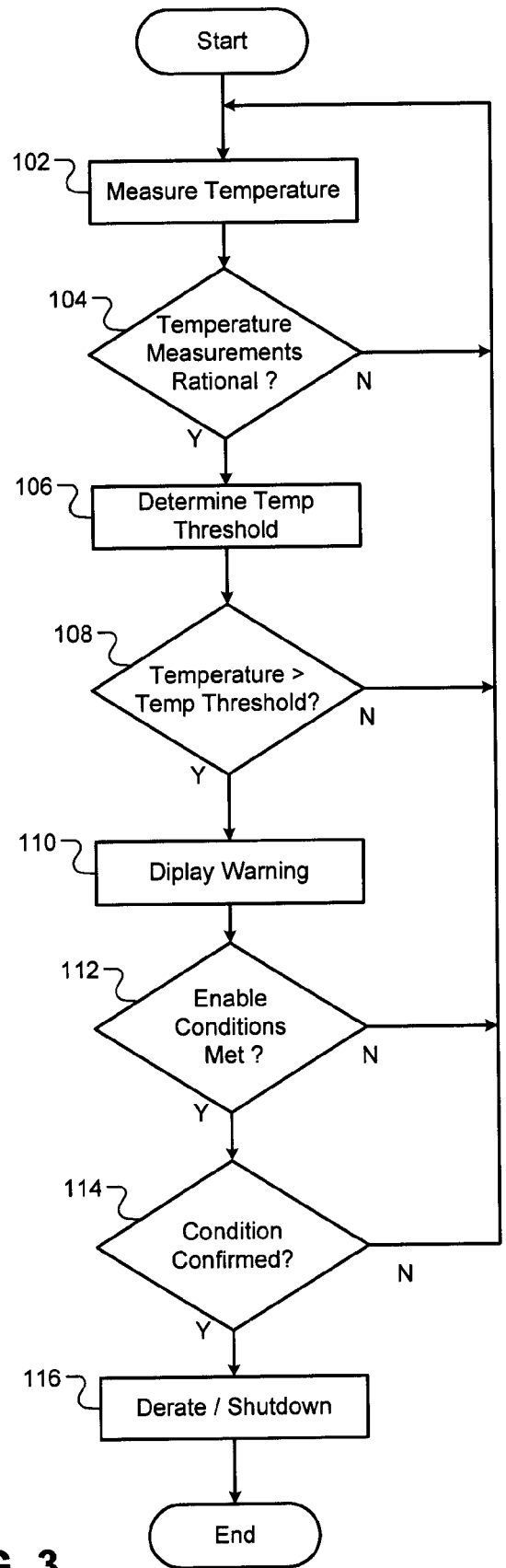
FIG. 3 is a flowchart illustrating the operation of control logic for thermal detection and protection of hardware according to the principles of the present disclosure.

Referring now to FIG. 3, a flowchart depicts exemplary operation of the exhaust system control module 44. Control begins in step 102, where temperature is measured. For example, one or more of the inlet, outlet, and exterior temperatures of the PM filter 34 may be measured. A single temperature value may be generated, such as by averaging the inlet and outlet temperatures.

Control continues in step 104, where control determines whether the temperature measurements are rational. If so, control transfers to step 106; otherwise, control returns to step 102. Rationality of temperature measurements may be determined as described above with respect to the thermal detection module 80. In step 106, control determines a temperature threshold. For example, the temperature threshold may be reduced when the exhaust system is not in regeneration mode.

Control continues in step 108, where control determines whether the measured temperature is greater than the temperature threshold. If so, control continues in step 110; otherwise, control returns to step 102. In step 110, control displays a warning to the driver. For example, this may include a check engine light, a text-based indicator, or an exhaust system warning light. In addition, a warning sound may be generated.

Control continues in step 112, where control determines whether enable conditions are met. If so, control transfers to step 114; otherwise, control returns to step 102. As described above, the enable conditions may include, for example, engine speed, vehicle speed, fuel delivery rate, and ambient air temperature. In step 114, control may determine whether the over-temperature condition is confirmed by other data. If so, control transfers to step 116; otherwise, control returns to step 102. Over-temperature conditions may be confirmed by, for example, engine misfire, leaky fuel injectors, and a pressure differential across the PM filter 34.

In step 116, remedial action is performed. For example, the engine control module 42 may be instructed to limit the torque produced by the engine. In various implementations, if the exhaust temperature does not decrease and/or if the derivative of the exhaust temperature does not decrease, more severe remedial action may be taken. For example, the engine's torque may be more severely limited or the engine may be shut down. Control then ends. In various implementations, control may return to step 102 once the exhaust temperature falls below a predetermined threshold.

What is claimed is:

1. A control module comprising:
    a thermal detection module that receives temperature data of a particulate matter filter and that determines a temperature based on said temperature data; and a protection module that selectively reduces output of an engine when said temperature is greater than a temperature threshold.

2. The control module of claim 1 wherein said reducing output includes limiting torque of said engine to a predetermined threshold.

3. The control module of claim 1 wherein said reducing output includes limiting power of said engine to a predetermined threshold.

4. The control module of claim 1 wherein said reducing output includes shutting down said engine.

5. The control module of claim 1 wherein said temperature data includes temperature data from an inlet and an outlet of said particulate matter filter.

6. The control module of claim 1 further comprising a protection enable module that generates an enable signal based on at least one of fuel delivery rate, engine speed, ambient temperature, and vehicle speed, wherein said protection module reduces said output when said enable signal is received and said temperature is greater than a temperature threshold.

7. The control module of claim 6 wherein said protection enable module generates said enable signal when at least one of said fuel delivery rate, engine speed, ambient temperature, and vehicle speed is outside of a range established by respective lower limits and upper limits.

8. The control module of claim 1 wherein said protection module selectively reduces said output of said engine when said temperature is greater than said temperature threshold and a confirmation condition is present, wherein said confirmation condition is based on at least one of an engine misfire signal, a leaky fuel injector signal, and a pressure signal.

9. The control module of claim 8 wherein said pressure signal is based on a pressure differential between an outlet and an inlet of said particulate matter filter.

10. The control module of claim 1 wherein said thermal detection module evaluates said temperature data and disables said protection module from reducing said output of said engine when said temperature data is determined not to be reliable, wherein said thermal detection module evaluates said temperature data by comparing a rate of change of a component of said temperature data to a predetermined threshold.

11. A method comprising:
receiving temperature data of a particulate matter filter; and
selectively reducing output of an engine when a temperature based on said temperature data is greater than a temperature threshold.

12. The method of claim 11 wherein said reducing output includes limiting torque of said engine to a predetermined threshold.

13. The method of claim 11 wherein said reducing output includes limiting power of said engine to a predetermined threshold.

14. The method of claim 11 wherein said reducing output includes shutting down said engine.

15. The method of claim 11 wherein said temperature data includes temperature data from an inlet and an outlet of said particulate matter filter.

16. The method of claim 11 further comprising generating an enable signal based on at least one of fuel delivery rate, engine speed, ambient temperature, and vehicle speed, wherein said reducing is performed when said enable signal is received and said temperature is greater than a temperature threshold.

17. The method of claim 16 further comprising generating said enable signal when at least one of said fuel delivery rate, engine speed, ambient temperature, and vehicle speed is outside of a range established by respective lower limits and upper limits.

18. The method of claim 11 wherein said reducing is performed when said temperature is greater than said temperature threshold and a confirmation condition is present, wherein said confirmation condition is based on at least one of an engine misfire signal, a leaky fuel injector signal, and a pressure signal.

19. The method of claim 18 wherein said pressure signal is based on a pressure differential between an outlet and an inlet of said particulate matter filter.

20. The method of claim 11 further comprising:
evaluating said temperature data for reliability by comparing a rate of change of a component of said temperature data to a predetermined threshold; and
disabling said reducing when said temperature data is determined not to be reliable.

* * * * *